US011276008B1

(12) United States Patent
Carter et al.

(10) Patent No.: US 11,276,008 B1
(45) Date of Patent: Mar. 15, 2022

(54) PROVIDING RECOMMENDATIONS OF CREATIVE PROFESSIONALS USING A STATISTICAL MODEL

(71) Applicant: SHUTTERSTOCK, INC., New York, NY (US)

(72) Inventors: Andrew Carter, Toronto (CA); Nael El Shawwa, Toronto (CA); Adam Fabicki, Toronto (CA); Hedieh Montazeri, Toronto (CA)

(73) Assignee: SHUTTERSTOCK, INC., New York, NY (US)

( * ) Notice: Subject to any disclaimer, the term of this patent is extended or adjusted under 35 U.S.C. 154(b) by 995 days.

(21) Appl. No.: 15/945,684

(22) Filed: Apr. 4, 2018

(51) Int. Cl.
*G06F 9/44* (2018.01)
*G06N 7/00* (2006.01)
*G06Q 10/06* (2012.01)
*G06F 7/02* (2006.01)

(52) U.S. Cl.
CPC ......... *G06N 7/00* (2013.01); *G06Q 10/06311* (2013.01)

(58) Field of Classification Search
CPC ... G06F 3/0482; G06N 7/00; G06Q 10/06311
See application file for complete search history.

(56) References Cited

U.S. PATENT DOCUMENTS

| | | | | |
|---|---|---|---|---|
| 6,938,021 B2* | 8/2005 | Shear | ................ | G06Q 20/3674 705/67 |
| 7,685,132 B2* | 3/2010 | Hyman | ................ | G06F 16/437 707/999.01 |
| 2008/0091771 A1* | 4/2008 | Allen | ................ | G06Q 10/10 709/203 |
| 2008/0182563 A1* | 7/2008 | Wugofski | ............ | G06Q 30/02 455/414.2 |
| 2008/0183678 A1* | 7/2008 | Weston | ................ | G06F 16/335 |
| 2012/0290950 A1* | 11/2012 | Rapaport | ........... | H04N 21/8358 715/753 |
| 2013/0073389 A1* | 3/2013 | Heath | ................ | G06Q 50/01 705/14.54 |
| 2013/0124449 A1* | 5/2013 | Pinckney | ............ | G06F 16/2425 706/52 |

(Continued)

*Primary Examiner* — Nicholas Augustine
(74) *Attorney, Agent, or Firm* — McDermott Will & Emery LLP

(57) ABSTRACT

A method for providing recommendations of creative professionals to complete a project is provided. The method includes receiving information related to a project, the information including a first set of criteria associated with the project. The method includes determining, using a statistical model, a vector representation corresponding to a candidate creative professional based on the information related to the project. The method also includes determining respective vector representations of a first set of creative professionals based at least in part on profile information related to each of the creative professionals. The method includes determining respective distances of each of the respective vector representations from the vector representation corresponding to the candidate creative professional. Further, the method includes providing a second set of creative professionals as recommendations for being assigned to the project based at least in part on the respective distances.

20 Claims, 10 Drawing Sheets

(56) References Cited

U.S. PATENT DOCUMENTS

| | | | |
|---|---|---|---|
| 2014/0075004 A1* | 3/2014 | Van Dusen | H04L 41/04 709/223 |
| 2015/0120641 A1* | 4/2015 | Soon-Shiong | G06N 5/04 706/52 |
| 2016/0162478 A1* | 6/2016 | Blassin | G06Q 10/06311 706/12 |

* cited by examiner

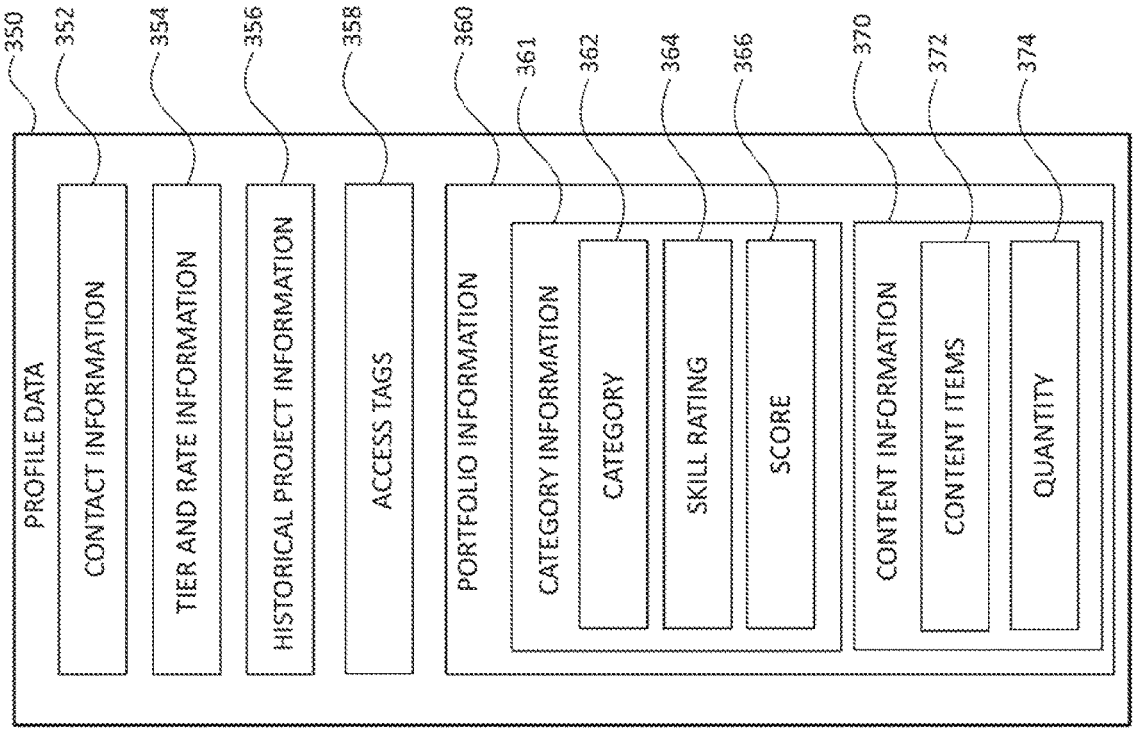
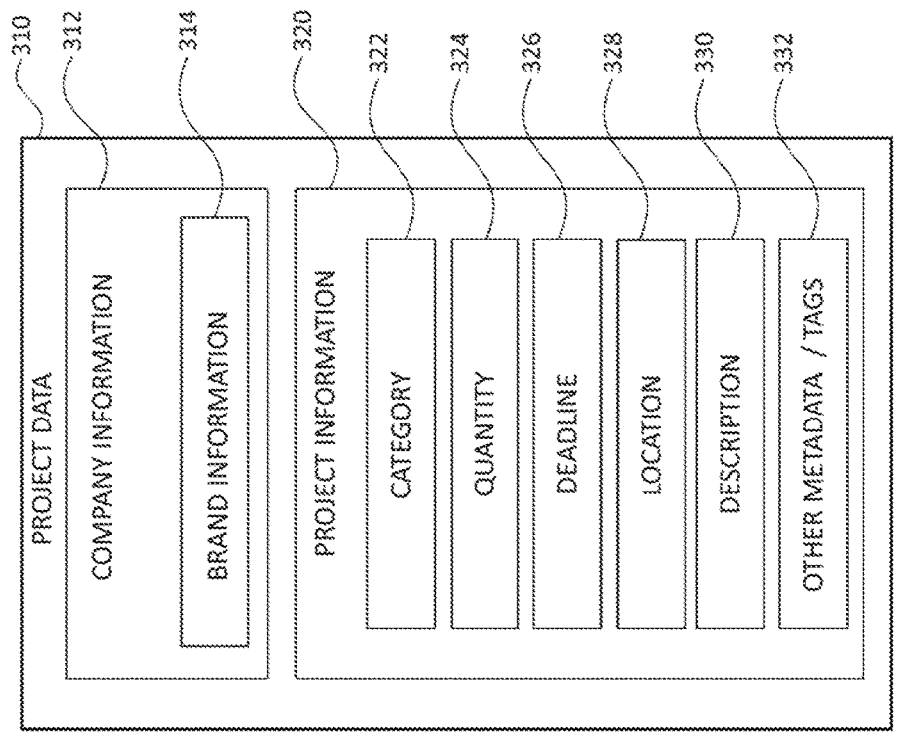
FIG. 3

Restaurant A's Canada: Get Out There!

◁ Gallery

| Brief Details | Download Brief |

The Task

Restaurant A's Canada is looking for appetizing images of their food for Social Media that will be posted throughout Winter 2018. The images should showcase fun outdoor activities (sports, games, etc.) with Restaurant A during the winter season (not holiday-related). Square orientation required with VERY MINIMAL post-production/colour correction. Please submit double the required photos for Photo Stock Custom to curate from.

Sample Photos

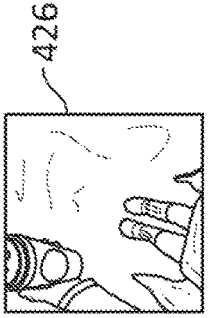 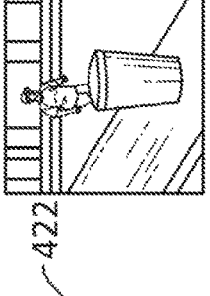 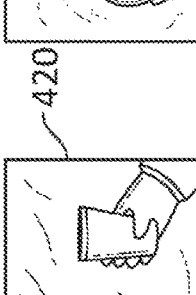 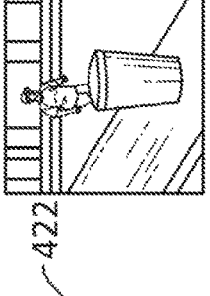

420  422  424  426

Brand Visual Guidelines

Below are the Brand's Visual Guidelines selected for this brief.

Environments - Outdoor

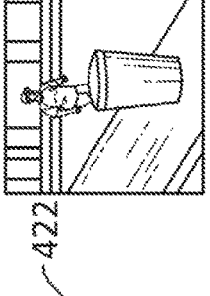 CITYSCAPES  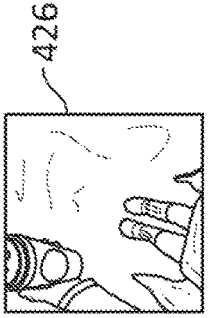 RESIDENTIAL   ABANDONED STRUCTURES

✓ DO: Around white/fresh snow whenever possible. Can be in a residential, park, cityscape, or cottage-like area.

✗ DON'T: Indoor shots, depressing gloomy weather, slushy or brown snow

FIG. 4

Do's & Dont's
FOOD STYLING

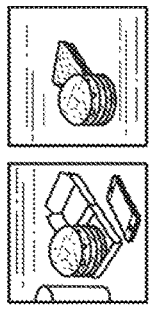 

NEAT AND APPETIZING, full food unwrapped/out of the box, 1 meal per person max, food sold by Restaurant A Sloppy/misshapen, food hidden by packaging, to-go bags, sauce on sandwiches, empty fry boxes, wilted lettuce stains, grease stains melty ice cream, trays without tray liners

FOOD STYLING: French Fries

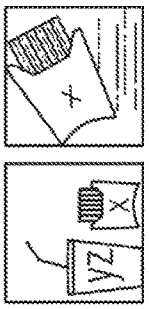 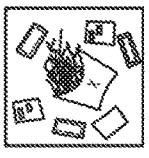

Restaurant A's fries only, golden colour, order with NO salt, if box is shown it must be medium size and FULL (order extra and replenish box as necessary)

Grease stains, fries that are perfectly lined up inside the box, to-go bags or to-go packaging, empty-looking boxes, salt, small fry box, large fry box

FOOD STYLING: Breakfast Sandwiches

Order of ingredients must be as follows (from top to bottom):

Egg Sandwich: top of english muffin, egg, cheese, bottom of english muffin
Bacon'n Egg Sandwich: top of english muffin, egg, bacon, cheese, bottom of english muffin
Sausage'n Egg Sandwich: top of english muffin, egg, sausage, cheese, bottom of english muffin
Sausage, Egg, & Cheese Griddle Sandwich: top of griddle cake, egg, sausage, cheese, bottom of griddle cake

| 1. Find Contributors | 2. Assignment Terms | 3. Email Template | 4. Review & Send (0) |

○ Name
[          ]

● Filters

Recommendation Engine
● Recommendations
○ Manual

Media Types
● Photo
○ Video
○ GIFs
○ 360°
○ Cinemagraphs

FPP Manager
[ Select ▽ ]

Categories
[ Food & Drink ▽ ]

Age

[ Search ] Total results: 308     Max contributors to add [    ]

| 710 Contributor | 720 Location ⇕ | 730 Score ⇕ | Add |
|---|---|---|---|
| ☆ ABC123 (24)<br>Manager: Jane Doe<br>760 | Burnaby<br>(Canada) — 752<br>Recommendation Rank — 754<br>(lower is better) | 84% overall — 750<br>67% acceptance rate — 755<br>100% timeliness — 751<br>0.31 minkowskiDistance — 753<br>29 assignments completed | [Add] |
| ☆ DEF456 (28)<br>Manager: John Smith<br>770 | Ucluelet<br>(Canada) | 86% overall<br>87% acceptance rate<br>100% timeliness<br>0.42 minkowskiDistance<br>39 assignments completed | [Add] |
| ☆ GHI789 (24)<br>Manager: Jane Doe<br>780 | Philadelphia<br>(United States) | 85% overall<br>86% acceptance rate<br>100% timeliness<br>0.44 minkowskiDistance<br>65 assignments completed | [Add] |
| ☆ AABB1122<br>Manager: Mike Jones<br>790 | Victoria<br>(Canada) | 83% overall<br>67% acceptance rate<br>100% timeliness<br>0.51 minkowskiDistance<br>19 assignments completed | [Add] |

FIG. 7

PROVIDING RECOMMENDATIONS OF CREATIVE PROFESSIONALS USING A STATISTICAL MODEL

BACKGROUND

Field

The present disclosure generally relates to providing recommendations for creative professionals (e.g., photographers) to assign to a given project for custom content. More specifically, the present disclosure relates to providing recommendations for creative professionals using a statistical model that analyzes, at least in part, a creative professional's experience, past performance, and/or past customer satisfaction metrics to provide an indication of a likelihood of success for completing a project.

Description of the Related Art

A photography site may provide access to photographers and/or other creative professionals that offer services in creating customized content (e.g., images, video, etc.). However, matching a photographer to a particular company requesting such services for a given project can be a laborious task that involves extensive human effort in order to match candidate photographers to the needs of the requesting company. In some examples, a human reviewer performs a manual review of the requirements for the project (e.g., based on a company's brand or visual identity) and then manually selects photographers that represent potential candidates for completing the project. Unlike tangible products, photographers, however, represent non-tangible "items" that may be more difficult to quantify in an objective manner without incurring subjective biases from human reviewers that are performing the matching. Consequently, the subjective approach of matching the photographers may provide inconsistent matching results. Further, subjective biases in matching photographers can also lead to unintended results including, for example, underutilizing available photographers. Further, existing systems for providing recommendations may focus on providing recommendations for tangible products, which would be inapplicable in providing recommendations of photographers and other creative professionals to complete projects.

SUMMARY

In one embodiment of the present disclosure, a computer-implemented method is described for providing recommendations for creative professionals to complete a project. The computer-implemented method includes receiving information related to a project, the information including a first set of criteria associated with the project. The computer-implemented method includes determining, using a statistical model, a vector representation corresponding to a candidate creative professional based on the information related to the project. The computer-implemented method includes determining respective vector representations of a first set of creative professionals based at least in part on profile information related to each of the creative professionals. The computer-implemented method includes determining respective distances of each of the respective vector representations from the vector representation corresponding to the candidate creative professional. The computer-implemented method includes providing a second set of creative professionals as recommendations for being assigned to the project based at least in part on the respective distances.

According to one embodiment, a system is described that includes one or more processors and a memory coupled to the one or more processors, the memory including instructions that, when executed by the one or more processors, cause the one or more processors to receive information related to a project, the information including a first set of criteria associated with the project, determine, using a statistical model, a vector representation corresponding to a candidate creative professional based on the information related to the project, determine respective vector representations of a first set of creative professionals based at least in part on profile information related to each of the creative professionals, determine respective distances of each of the respective vector representations from the vector representation corresponding to the candidate creative professional, and provide a second set of creative professionals as recommendations for being assigned to the project based at least in part on the respective distances.

According to one embodiment, a non-transitory, machine readable medium is described that includes instructions, which when executed by one or more processors, cause a computer to perform a method for providing recommendations for creative professionals to complete a project. The method includes receiving information related to a project, the information including a first set of criteria associated with the project. The method includes determining, using a statistical model, a vector representation corresponding to a candidate creative professional based on the information related to the project. The method includes determining respective vector representations of a first set of creative professionals based at least in part on profile information related to each of the creative professionals. The method includes determining respective distances of each of the respective vector representations from the vector representation corresponding to the candidate creative professional. The method includes providing a second set of creative professionals as recommendations for being assigned to the project based at least in part on the respective distances.

In yet other embodiment, a system is described that includes a means for storing commands and a means for executing the commands causing the system to perform a method that includes receiving information related to a project, the information including a first set of criteria associated with the project. The means for executing further causes the system to perform the method including determining, using a statistical model, a vector representation corresponding to a candidate creative professional based on the information related to the project. The means for executing further causes the system to perform the method including determining respective vector representations of a first set of creative professionals based at least in part on profile information related to each of the creative professionals. The means for executing further causes the system to perform the method including determining respective distances of each of the respective vector representations from the vector representation corresponding to the candidate creative professional. The means for executing further causes the system to perform the method including providing a second set of creative professionals as recommendations for being assigned to the project based at least in part on the respective distances.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 illustrates example data structures of project data and profile data in accordance with some embodiments of the subject technology.

FIG. 4 illustrates a graphical interface of an application providing details of a project that may be completed by a creative professional in accordance with some embodiments of the subject technology.

FIG. 5 illustrates a graphical interface of an application providing further details of the project previously illustrated in FIG. 4.

FIG. 6 illustrates a graphical interface of an application for calibrating a project or brand with respect to preferences related to visual characteristics in accordance with some embodiments of the subject technology.

FIG. 7 illustrates a graphical interface of an application providing recommendations of creative professionals for completing the project previously described in FIGS. 4, 5, and 6.

In the figures, elements and steps denoted by the same or similar reference numerals are associated with the same or similar elements and steps, unless indicated otherwise.

DETAILED DESCRIPTION

Figure 1:
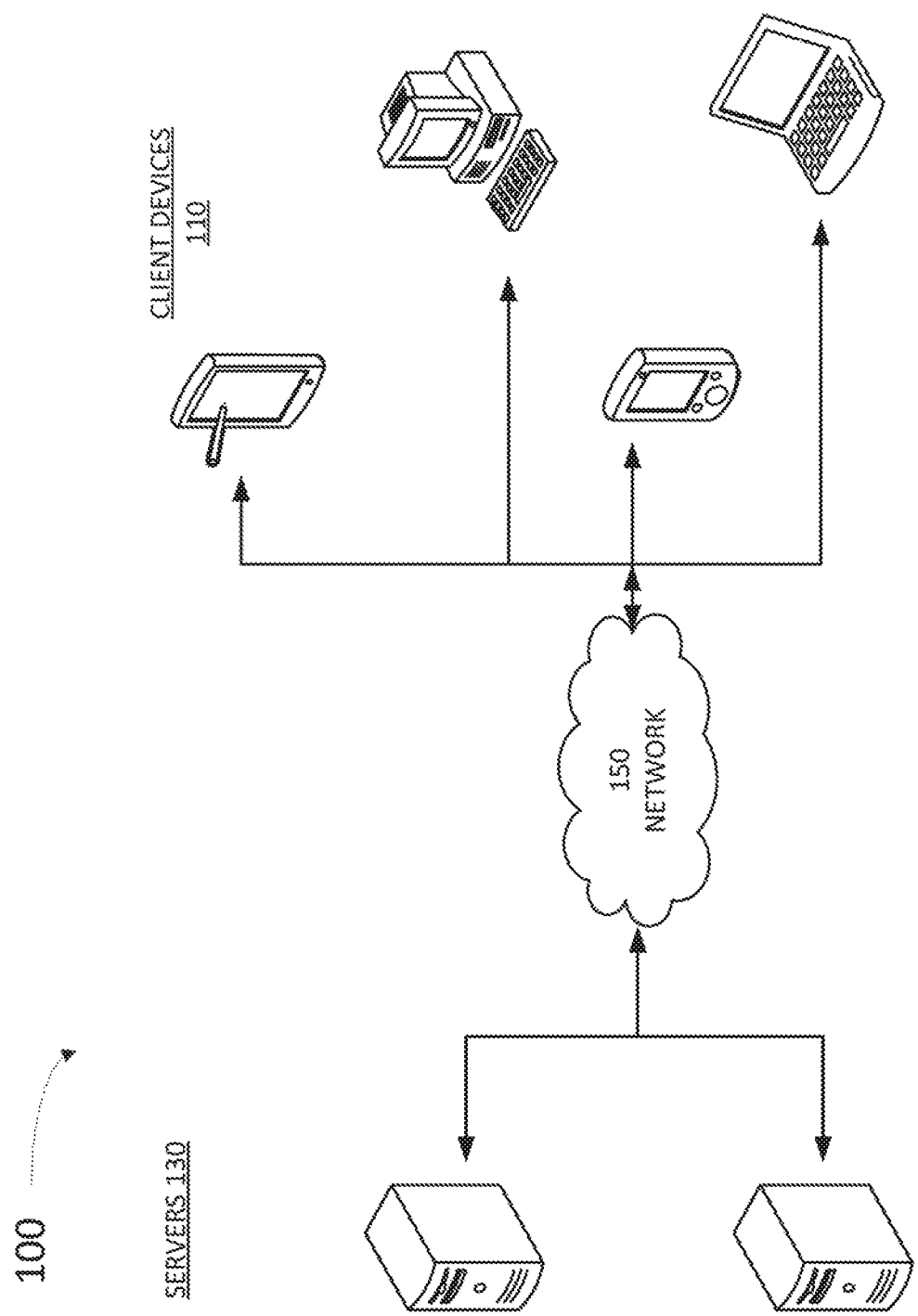
FIG. 1 illustrates an example architecture suitable for providing recommendations of creative professionals to assign to projects, according to some embodiments of the subject technology.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "creative professional" refers to a person who is employed for skills in creative endeavors such as photography, filmmaking, videography, graphic design, visual arts, animation, etc.

The present disclosure relates to providing recommendations of creative professionals that match requirements set by a particular entity (e.g., company, customer, etc.) corresponding to a project requesting content items that may be completed by such creative professionals.

Embodiments as disclosed herein provide a solution to the problem arising in the realm of computer technology and network search engines of recommending creative professionals to complete projects in an automated manner. Tools as disclosed herein help users to locate creative professionals that can complete projects that have been submitted by such users. In an example, a user connected with a company may want to hire a creative professional to create content items (e.g., photos, etc.) for the company's business campaign.

The subject system provides several advantages, including a feature for automatically recommending creative professionals for assigning to a project based on the criteria of the project. Such projects may call for media content (e.g., photos) to be created and/or provided based on different criteria including, for example, location, category, quantity, etc. The proposed solution further provides improvements to the functioning of the computer itself because it can reduce processing time for determining creative professionals (e.g., users in the system) as the techniques described herein improve the efficiency of making the determination and can improve scalability of the system as datasets of creative professionals and/or projects increase in size over time. Additionally, the subject system decreases a burden on a computer processor, network hardware and resources, and/ or device power for conducting multiple searches that may be executed by the system because the automated recommendation techniques can provide efficiencies across one or more components of the system resulting in improvements that may be realized in an observable manner.

Embodiments disclosed herein include tools for providing recommendations of creative professionals to complete a project (e.g., as submitted by a user) using the recommendation techniques described herein.

Example System Architecture

FIG. 1 illustrates an example architecture 100 for a recommendation engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor in server 130 is configured to provide recommendations of creative professionals to complete a project submitted by a user of client device 110. The processor in server 130 determines a vector representation of a statistical model of a candidate creative professional, and provides a set of creative professionals in the system based on respective distances from the vector representation, where the respective distances may correspond to a metric of similarity to the vector representation. For purposes of load balancing, multiple servers 130 can host memories including instructions to one or more processors.

Servers 130 may include any device having an appropriate processor, memory, and communications capability for hosting a recommendation engine, profile database, project database, image database, and image search engine. The recommendation engine and/or image search engine may be accessible by various clients 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
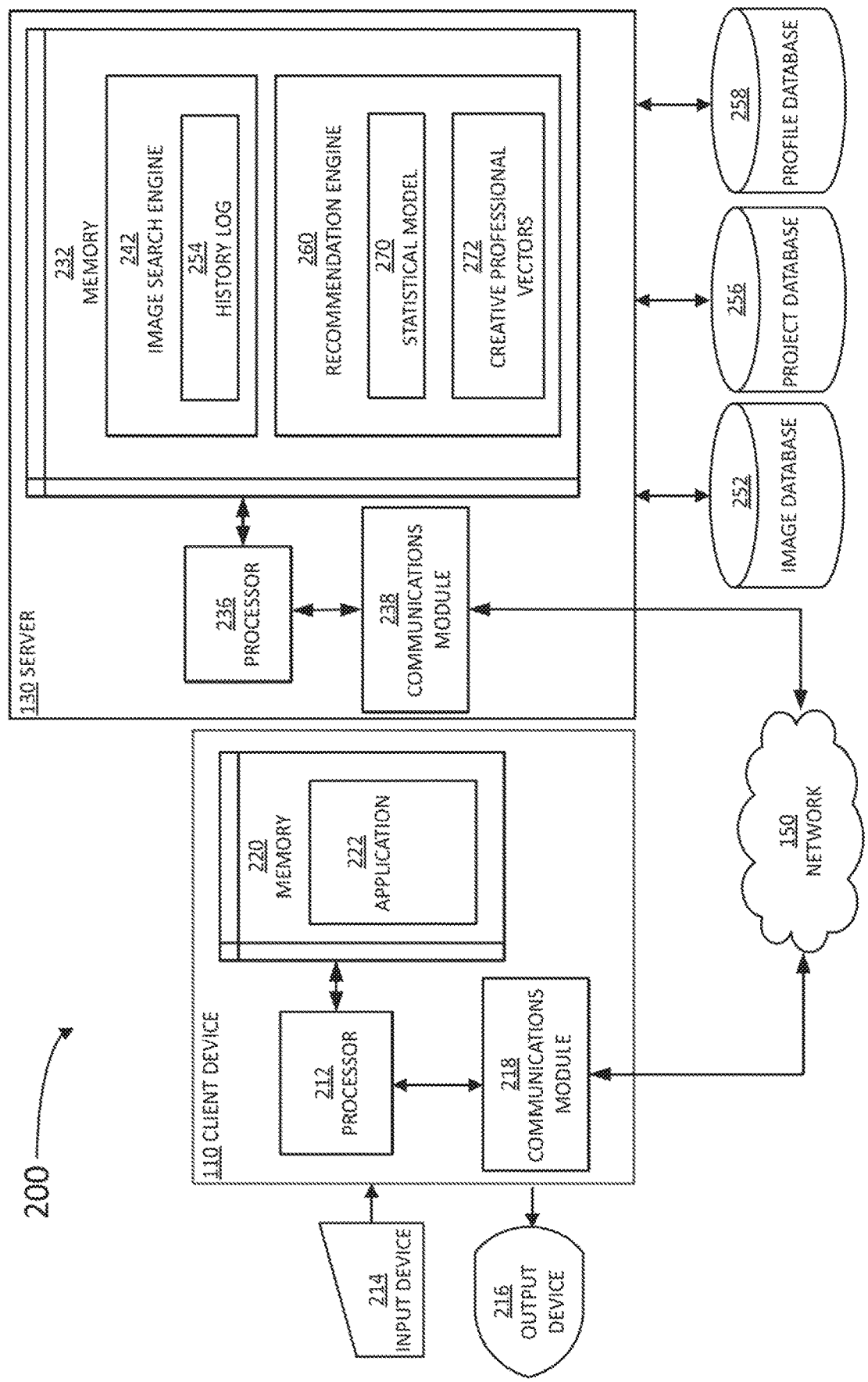
FIG. 2 is a block diagram illustrating an example server and client from the architecture of FIG. 1, according to some embodiments of the subject technology.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes an image search engine 242 for searching images stored in an image database 252. A user may access image search engine 242 through an application 222 or a web browser installed in client device 110. Accordingly, application 222 may be installed by server 130 and perform scripts and other routines provided by server 130. The application 222 may be configured to send requests and receive responses to such requests from the image search engine 242. Execution of application 222 may be controlled by a processor 212 in client device 110.

Memory 232 may further include a recommendation engine 260 for providing recommendations of creative professionals for completing projects that have been submitted by the user of client device 110 (or any other user) where information for such projects may be stored in a project database 256. The project database 256, in an example, may store a large number of projects (e.g., greater than 500). An example of a data structure for storing information of a project is described in more detail in FIG. 3. Information corresponding to the creative professionals may be stored in a profile database 258 and/or the image database 252 (e.g., for content items associated with the creative professionals). An example of profile information of a creative professional is described in more detail in FIG. 3. Creative professionals may also have respective user accounts registered on the server 130, in the image database 252, and/or information stored in the profile database 258.

To provide recommendations, embodiments of the recommendation engine 260 use 1) a statistical model 270 for determining a vector representing an "ideal" creative professional for a given project derived from information stored in the project database 256, and 2) creative professional vectors 272 representing respective creative professionals, which may be derived from information stored in the profile database 258. The recommendation engine 260 determines a distance (e.g., a Minkowski distance) between the vectors (e.g., respective scores discussed further below) of the statistical model 270 and each of the creative professional vectors 272. The recommendation engine 260 may provide a set of creative professionals (e.g., the top one hundred) that are ranked in order based on the respective distances. An example user interface for providing recommended creative professionals is described further in FIG. 7 below.

The image database 252 can be, for example, a dataset associated with images corresponding to a number of portfolios for creative professionals. A user of client device 110 having an application 222 installed by, and registered with, server 130, may have a user account in the image database 252, storing multiple images owned and/or licensed by the user. The user account for each user may be handled through a history log 254 in memory 232. In some embodiments, the server 130 may maintain the history log 254 that includes a log of entries indicating the previous image searches of each user, and projects that have been submitted by each user. The image database 252 can include a large number of images (e.g., millions of images, or more) in an example.

The recommendation engine 260, image search engine 242, the image database 252, the project database 256, and the profile database 258 may be part of the same memory 232 in server 130. In some embodiments, the recommendation engine 260, the image search engine 242, the image database 252, the project database 256, and/or the profile database 258 may be hosted in a different server that is accessible by server 130.

FIG. 3 illustrates example data structures of project data and profile data in accordance with some embodiments of the subject technology. Not all of the depicted components may be used in all implementations, however, and one or more implementations may include additional, different, or fewer components than those shown in the figure. Variations in the arrangement and type of the components may be made without departing from the scope of the subject technology disclosed herein.

As discussed above in connection with FIGS. 1 and 2, a user (e.g., associated with a company or entity) may submit projects that creative professionals can complete. Embodiments of the subject technology provide respective data structures representing projects submitted by a user and profiles of creative professionals that may complete such projects. In an example, the recommendation engine 260 utilizes these data structures, at least in part, to determine vector representations of creative professionals registered in the system (e.g., as registered with user accounts in the server 130), and a vector representation of an "ideal" candidate creative professional for successfully completing a given project. As discussed further below, distances between the respective vectors are then compared in order to provide a subset of creative professionals as recommendations for completing the project.

A project submitted by a user may include data stored in a format represented, in an embodiment, as project data 310. As illustrated, project data 310 includes company information 312, which includes brand information 314 for a company. Brand information 314, in an example, may include a description of the company including, for example, a name, logo, design, or a combination of those and/or other information that may be used to identify the company. Project data 310 further includes project information 320. Project information 320 includes information for a category 322, quantity 324 corresponding to a number of content items that the project may require, deadline 326 corresponding to a date and/or time for completing the project, location 328 for the project, description 330 including guidelines and other requirements, and other metadata or tags 332. Examples of categories that may be stored in category 322 include, but are not limited to categories such as family, automotive, animals and pets, product, food and beverage, lifestyle, landscape, and photojournalism. It is appreciated that other types of categories may be included without limitation as the previous examples are provided for explanatory purposes. Examples of other metadata or tags 332 may include rate information, a tier of a creative professional that is attributed to the project, and/or access tags (discussed below).

The recommendation engine 260 may determine, using a statistical model (e.g., the statistical model 270) and the project data 310, a vector representing a candidate creative professional that represents an "ideal" person with attributes indicating a substantial likelihood to successfully complete a project related to the project data 310. Different properties associated with a creative professional may be included in profile data 350. As illustrated, profile data 350 includes contact information 352, tier and rate information 354, historical project information 356, and access tags 358. In an example, contact information 352 includes personal contact information for the creative professional including name, telephone number, email address, etc. Creative professionals may be grouped into different tiers based on skillset and/or rates charged (e.g., pricing) and tier and rate information 354 may include information indicating which tier corresponds to the creative professional and/or rate(s) that the creative professional may charge a third party for services.

Historical project information 356 includes a record of prior projects involving the creative professional. In an example, historical project information 356 may include references or links to one or more respective data structures of project data 310 corresponding to respective projects. Examples of information included in historical project information 356 may include a value indicating a number of projects that have been completed by the creative professional, a value related to a measure of timeliness for completing projects, and a value indicating how many content items were accepted by the user that created the project and/or a value indicating how many content items were accepted overall across all projects that the creative professional has completed.

Access tags 358 may include information related to environments, people, places, and things that the creative professional has access to or has available to use. For example, information indicating that the creative professional has access to drones (e.g., an unmanned aerial vehicle) in the access tags 358 may be utilized to match the creative professional to a project that is seeking content items related to drone footage, and/or in determining a vector representation of the creative professional.

Portfolio information 360 includes category information 361. In one or more embodiments, category information 361 may correspond to a particular category of content items that the creative professional has previously been involved in and/or have images pertaining to that particular category in the image database 252. As shown, category information 361 includes a category 362 indicating a name of the category, skill rating 364 indicating or describing the creative professional's skill level in the category, and a score 366 corresponding to a value representing a numerical-based score or a metric of skill for the creative professional in the category. As mentioned above, categories stored in category 362 may include family, automotive, animals and pets, product, food and beverage, lifestyle, landscape, and photojournalism. Other categories may be included without limitation.

Portfolio information 360 further includes content information 370 that includes information of content items in the portfolio. For example, content information 370 includes content items 372 and quantity 374 indicating a number of content in the category indicated by category 362. In an example that content items 372 are images, it is appreciated that the content items 372 may not be actual image data but references or links to locations of corresponding images stored in the image database 252.

In an embodiment, an initial score related to the score 366 may be determined by analyzing the creative professional's existing image portfolio (e.g., before completing the project). The recommendation engine 260 may perform image analysis of the images that determines a measure of aesthetic quality of the images and assigns a score based on the analysis. In another example, an initial score may be a predetermined default score that is assigned without any analysis on the images. The recommendation engine 260 may also do an analysis based on information derived from a social network site (e.g., a photo sharing social network). For example, the recommendation engine 260 may determine a number of followers of the creative professional to determine a similar audience, a number of content items, and whether the content items have similar subjects. Using this information derived from the social network site, the recommendation engine 260 may search for other creative professionals with a profile in the profile database 258 that include similar information derived from the social network site, and assign a score substantially similar to that of one of the other creative professionals with the similar profile.

The recommendation engine 260, using project data (e.g., the project data 310), may determine a vector representation of a candidate creative professional based on respective scores in one or more categories for a project. In an example, an initial score for a given category may be based on a default value which can be adjusted over time. In another example, a respective score in a particular category for the candidate creative professional may correspond to a highest score in the same category among creative professionals with accounts on the server 130.

The recommendation engine 260, using profile data (e.g., the profile data 350), may determine a vector representation of a creative professional with a user account registered in the server 130 based on a "contributor" score. The contributor score may represent an aggregate or overall score attributed to a creative professional for a single project. In some embodiments, to determine the contributor score, the recommendation engine 260 measures how closely a given creative professional has completed a project in accordance with the requirements of a project. For example, a project may require a quantity of ten (10) images in a particular category be submitted for the project. The recommendation engine 260 may determine a measure of how successful the creative professional was in providing the ten required images and calculate a score based on this measure. The recommendation engine 260 may also determine a measure of how many of the provided images were accepted by the creator of the project (e.g., the company or other user asking for the ten images) and calculate a different score based on this measure. The recommendation engine 260 may also determine a measure of how reliable the creative professional was on the project from a time perspective (e.g., did the creative professional submit the ten required images by the deadline specified by the project) and calculate a respective score based on this measure.

In determining the contributor score, the recommendation engine 260 may also utilize various signals from the perspective of the brand or company related to the project. For example, if the creative professional has completed at least one previous project for the same brand or company, the recommendation engine 260 can determine a measure indicating how many previous images were accepted by the same brand or company (e.g., by using historical project information 356), which may then be included in determining the contributor score for the creative professional.

FIG. 4 illustrates a graphical interface 400 ("interface") of an application providing details of a project (e.g., "brief") that may be completed by a creative professional. In an example, the application may provide information from project data (e.g., the project data 310) for display in the interface 400.

As illustrated, the interface 400 includes a description 410 related to the project which includes information describing the requirements of the project and other instructions for a creative professional to perform. The interface 400 further includes images 420, 422, 424, and 426, which may be images stored in the image database 252. The images 420, 422, 424, and 426 are example images that may be provided by the creator of the project to indicate images that may include suitable subjects and/or suitable aesthetic characteristics that are in accordance with the requirements of the project.

The interface 400 includes visual guidelines 430 for the project. In the example of FIG. 4, visual guidelines 340 may be indicated in a graphical form (e.g., as respective images and/or text) including a set of graphical images 440 with corresponding text (e.g., "cityscapes," "residential," "abandoned structures"). The interface 400 further includes textual guidelines 450 that describe other instructions for completing the project.

FIG. 5 illustrates a graphical interface 500 ("interface") of an application providing further details of the project previously illustrated in FIG. 4. In an example, the application may provide additional information from project data (e.g., the project data 310) for display in the interface 500.

As illustrated, the interface 500 includes textual guidelines 510, 520, 530 and 540 with information that describe further instructions for completing the project. Each of the textual guidelines 510, 520, 530 and 540 may be provided in conjunction with one or more images as examples of such guidelines as shown in FIG. 5. In the example of FIG. 5, textual guidelines 510 and 530 may include affirmative instructions for requirements of the project, and textual guidelines 520 and 540 may include negative instructions not to perform or include in content items for the project. The interface further includes textual guidelines 550 with respective information for a different subject (e.g., breakfast sandwiches) of the project.

Figure 6:
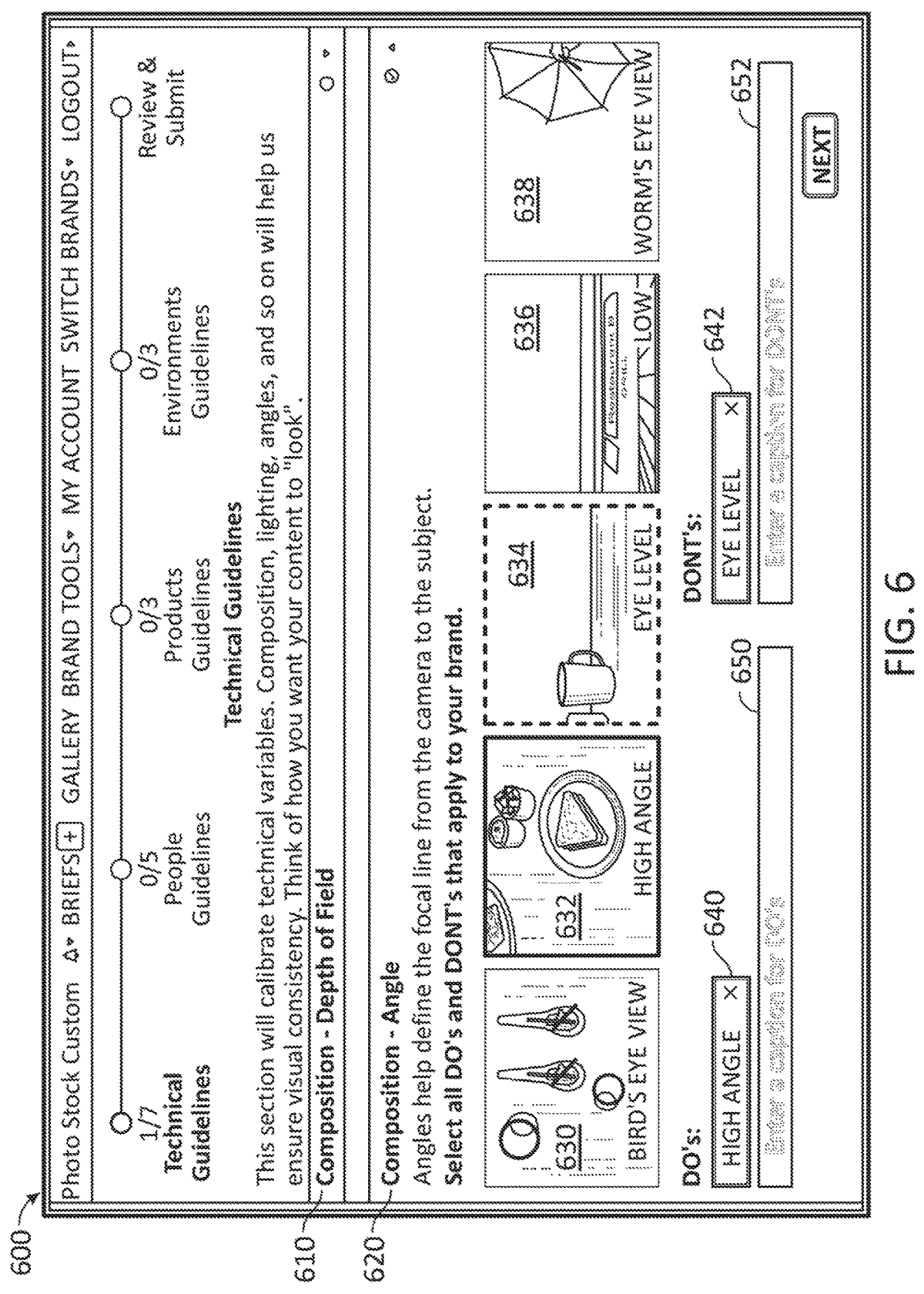

FIG. 6 illustrates a graphical interface 600 ("interface") of an application for calibrating a project or brand with respect to preferences related to visual characteristics. In an example, the application may provide additional settings corresponding to profile data and/or project data (e.g., the profile data 350 and/or the project data 310) for display in the interface 600.

For a creator of a project, this creator (e.g., a user that is associated with a brand or company related to the project) may utilize the interface 600 to identify and select preferences across multiple variables such as composition, lighting, product interactions, etc., that are applicable to the project and/or brand related to the project. These selected preferences, including the variables, may be stored as part of a profile for the project creator, brand, and/or company. In this manner, the profile for each brand may be utilized to match creative professionals with preferences based on, for example, past performance as well as the portfolio of such creative professionals. As projects are completed for each brand, brand guidelines related to the selected preferences may be kept up to date to reflect feedback given on content items that were provided by creative professionals as well as changes in the brand's requirements related to one or more visual characteristics.

The interface 600 enables setting different preferences related to composition, lighting, angles, etc., to assist in providing visual consistency for a given brand. For example, each preference provided for display may include one or more graphical elements that may be selectable by a user to facilitate the selection of such preferences (and inclusion as part of a profile related to the project and/or brand). As illustrated, the interface 600 includes a preference 610 related to depth of field, and a preference 620 related to angle. One or more of images 630, 632, 634, 636 and 638 may also be selected by a user to include as guidelines in the profile related to the brand. A graphical element 640 indicates that the image 632 was selected, and a graphical element 642 indicates that the image 634 was selected. The interface 600 further includes a graphical element 650 and a graphical element 652 (e.g., respective text input fields) to receive input for describing respective captions for the selected guidelines.

FIG. 7 illustrates a graphical interface 700 ("interface") of an application providing recommendations of creative professionals for completing the project previously described in FIGS. 4, 5, and 6. As discussed previously, the recommendation engine 260 may use profile data and project data to calculate distances between vector representations of a candidate creative professional (e.g., an "ideal" hypothetical creative professional to complete the project) and profiles of creative professionals in the system, and determine recommended creative professionals for the project based on the distances.

As illustrated, the interface 700 includes contributor column 710, location column 720, and score column 730. As provided under the contributor column 710, names of different recommended creative professionals 760, 770, 780 and 790 with user accounts in the system are provided. Respective locations of the aforementioned creative professionals are provided under the location column 720.

In one or more embodiments, the score column includes different scores or metrics associated with the recommended creative professionals 760, 770, 780 and 790. As shown, a contributor score 750, an acceptance rate 751, a measure of timeliness 752, a Minkowski distance 753, and a number of completed projects 754 are provided for the recommended creative professional 760. The contributor score 750 may represent an overall or aggregate score of the creative professional 760 based at least in part on the acceptance rate 751, the measure of timeliness 752, the number of completed projects 754 and/or other scores or metrics such as a rating or score received for each of the completed projects 754. As can be seen, the interface 700 provides a sorted listing of the recommended creative professionals 760, 770, 780 and 790 based on respective Minkowski distances with higher ranking creative professionals being listed before lower ranking creative professionals. As referred to herein, a Minkowski distance corresponds to a distance between two respective points in a normed vector space.

In an embodiment, a lower Minkowski distance value for a creative professional indicates a higher ranking with respect to other creative professionals with higher Minkowski distance values. Thus, in the example of FIG. 7, the recommended creative professional 760 represents the highest ranked creative professional for being assigned to the project, and the other recommended creative professionals 770, 780, and 790 are ranked in descending rank, respectively, as the respective Minkowski distance values are increasing in value (e.g., 0.42, 0.44 and 0.51).

As further illustrated, the interface 700 may provide respective graphical elements for selecting a particular creative professional that is provided for display. For example, the interface 700 provides a graphical element 755 that is selectable to select or assign the creative professional 760 to the project. In an embodiment, a user of the application may therefore select one or more of the recommended creative professionals 760, 770, 780, and 790 to assign to the project using the selectable graphical elements.

Figure 8:
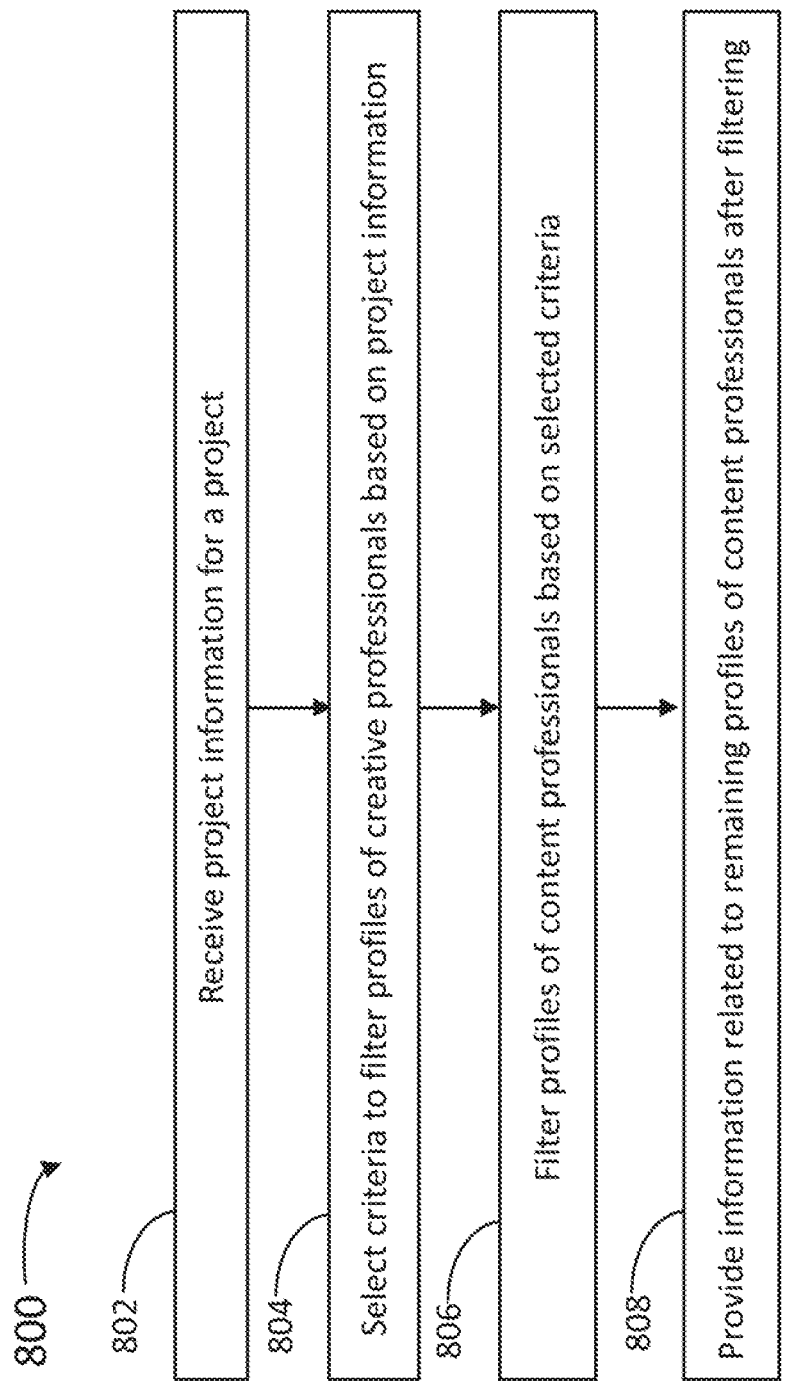
FIG. 8 is a flow chart illustrating steps in a method for filtering profiles of creative professionals using a set of criteria, according to some embodiments of the subject technology.

FIG. 8 is a flow chart illustrating steps in a method 800 for filtering profiles of creative professionals using a set of criteria, according to some embodiments of the subject technology. Method 800 may be performed at least partially by a user with any one of a plurality of client devices (e.g., any one of servers 130 and any one of client devices 110), and communicating with any one of a plurality of network servers hosting a collection of images, videos, and multimedia files (e.g., images and/or video clips). The client devices may be handled by a user, wherein the user may be registered to a private account with the server, or may be a visitor to the server website or logged into a server application and an application installed in the client device (e.g., the application 222). At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer, using an image search engine (e.g., the image search engine 242) and/or a recommendation engine (e.g., the recommendation engine 260). The database may include any one of an image database, project database, profile database, history log, statistical model, and creative professional vectors (e.g., the image database 252, the project database 256, the profile database 258, the history log 254, the statistical model 270, and the creative professional vectors 272). Methods consistent with the present disclosure may include at least some, but not all of, the steps illustrated in method 800, performed in a different sequence. Furthermore, methods consistent with the present disclosure may include at least two or more steps as in method 800 performed overlapping in time, or almost simultaneously.

Step 802 includes receiving information related to a project, the information including a first set of criteria associated with the project. In some embodiments, the information related to the project is received from project data 310 stored in the project database 256. In one or more embodiments, the first set of criteria of the project includes a type of content item, a quantity of content items, a date related to a deadline to complete the project, a location of the project, a description of the project, and visual characteristics related to a brand.

Step 804 includes selecting, from the first set of criteria, a second set of criteria to filter one or more profiles of creative professionals, each of the one or more profiles including profile information related to a particular creative professional. In one or more embodiments, the second set of criteria includes a geographical location or a tier of creative professional. It is appreciated that, in some embodiments, the second set of criteria may also include other selected data from the profile data 350 stored in the profile database 258. For example, profiles of creative professionals may be filtered according to a threshold value for score or skill rating provided in the profile data 350. Moreover, profiles of creative professionals may be filtered based on different rates or different technical skills.

Step 806 includes filtering a set of profiles of a plurality of creative professionals based on the selected second set of criteria. Profiles of the creative professionals may be stored as profile data in the profile database 258. In one or more embodiments, the filtering includes removing at least one profile from the set of profiles when at least one of the geographical location or the tier of creative professional does not match the profile information in the at least one profile. In this manner, one or more profiles of creative professionals in the profile database 258 are eliminated from being considered as recommendations to assign to the project, which potentially improves processing and/or computing time for determining such recommendations.

Step 808 includes providing the filtered set of profiles for determining respective vector representations of the set of creative professionals. An example method for determining vector representations for this filtered set of profiles is discussed below in FIG. 9, where the filtered set of profiles may be used as an input dataset for being processed in accordance with the steps described in FIG. 9.

Figure 9:
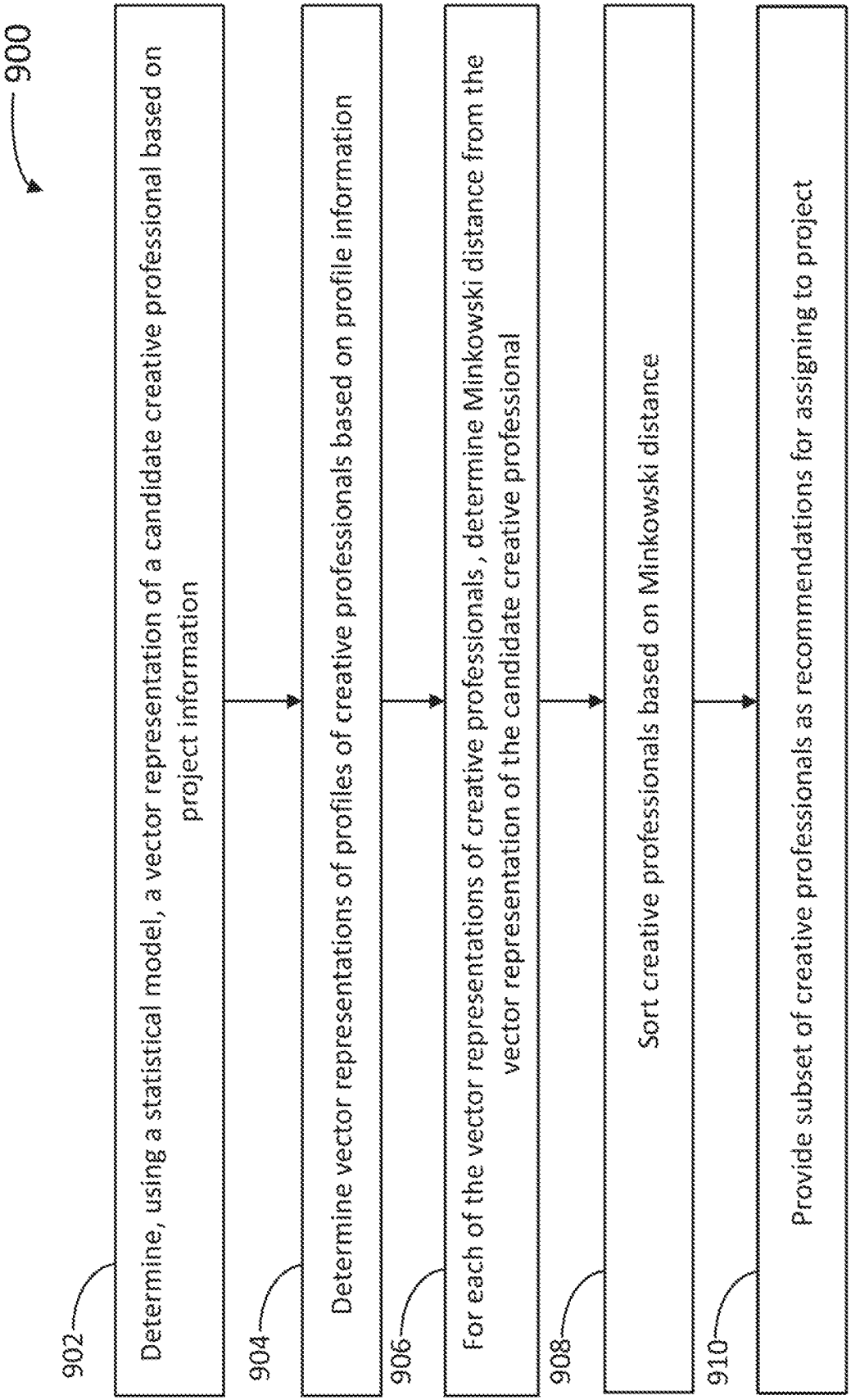
FIG. 9 is a flow chart illustrating steps in a method for providing recommended creative professionals to assign to a project, according to some embodiments of the subject technology.

FIG. 9 is a flow chart illustrating steps in a method 900 for providing recommended creative professionals to assign to a project, according to some embodiments of the subject technology. In an example, method 900 may be performed in conjunction with method 800 in FIG. 8 in order to provide vector representations of filtered profiles of creative professionals. Method 900 may be performed at least partially by a user with any one of a plurality of client devices (e.g., any one of servers 130 and any one of client devices 110), and communicating with any one of a plurality of network servers hosting a collection of images, videos and multimedia files (e.g., images and/or video clips). The client devices may be handled by a user, wherein the user may be registered to a private account with the server, or may be a visitor to the server website or logged into a server application and an application installed in the client device (e.g., the application 222). At least some of the steps in method 900 may be performed by a computer having a processor executing commands stored in a memory of the computer (e.g., processors 212 and 236, memories 220 and 232). Further, steps as disclosed in method 900 may include retrieving, editing, and/or storing files in a database that is part of, or is communicably coupled to, the computer, using an image search engine (e.g., the image search engine 242) and/or a recommendation engine (e.g., the recommendation engine 260). The database may include any one of an image database, project database, profile database, history log, statistical model, and creative professional vectors (e.g., the image database 252, the project database 256, the profile database 258, the history log 254, the statistical model 270, and the creative professional vectors 272). Methods consistent with the present disclosure may include at least some, but not all, of the steps illustrated in method 900, performed in a different sequence. Furthermore, methods consistent with the present disclosure may include at least two or more steps as in method 900 performed overlapping in time, or almost simultaneously.

Step 902 includes determining, using a statistical model, a vector representation corresponding to a candidate creative professional based on the information related to a project. In one or more embodiments, the vector representation corresponding to the candidate creative professional is based on a category of content items for the project, a score associated with the category of content items and one or more access tags. In an example, a highest score for a particular category included in the project, among the profiles of creative professionals in the profile database 258, is selected as part of determining the vector representation.

Step 904 includes determining respective vector representations of a first set of creative professionals based at least in part on profile information related to each of the creative professionals. In one or more embodiments, each of the first set of creative professionals is associated with respective user accounts and profiles in the profile database 258. In one or more embodiments, the profile information related to each of the creative professionals includes a measure of accepted content items, a measure of timeliness for completing one or more projects, and a number of completed projects. Further, the profile information may include any of the information discussed before in connection with profile data 350. For example, the profile information related to each of the creative professionals includes a score associated with a category, the score indicating a measure of skill of a particular creative professional in providing content items in the category.

In one or more embodiments, for a "new" creative professional (e.g., one without historical information for previous projects stored within the server 130 and/or the profile database 258), the subject technology may determine a vector representation at step 904 using the following techniques to enable matching the new creative professional to a project.

In one embodiment, an external portfolio of the new creative professional may be analyzed to determine a vector representation. In this example, one or more locations (e.g., external to the server 130 and/or the profile database 258) including content items created by the new creative professional may be scanned and analyzed. Such locations may correspond to a social media network, a photo or video sharing site, an external website associated with the new creative professional such as their personal or professional website, and/or other locations (e.g., cloud storage). In another embodiment, a portfolio stored within the system (e.g., the server 130, the image database 252, the project database 256, and/or the profile database 258) may be created for the new creative professional. The new creative professional would therefore have the capability to create and maintain their professional creative portfolio on the system (e.g., through using a client device).

In either of the aforementioned techniques for the new creative professional, the system may perform different operations on content items in a portfolio associated with the new creative professional. In an embodiment, content items (e.g., photos) are indexed and tagged based on subject matter, creative properties, and/or aesthetic properties to generate a new profile of a new creative professional to identify subjects and environments that the new creative professional has access to as well as creative elements of the photo such as technical ability in composition, angles, and/or lighting for example. Based on this newly generated profile, a vector representation may be created for a new creative professional where this vector representation is utilized to match the new creative professional to one or more projects.

In another example, the subject technology may match a new creative professional to one or more existing creative professionals with respective historical information related to at least previous performance on projects to predict which new creative professionals are similar to existing creative professionals that have performed successfully on previous projects (e.g., based on factors such as timeliness, a number of accepted content items, rating, etc.). In this manner, one or more new creative professionals may be provided as recommendations to one or more projects.

Step 906 includes determining respective distances of each of the respective vector representations from the vector representation corresponding to the candidate creative professional.

In an example, two points (e.g., corresponding to two respective vector representations) may be represented by the following notation:

$$X=(x_1, x_2, \ldots, x_n) \text{ and } Y=(y_1, y_2, \ldots, y_n) \in \mathbb{R}^p$$

The Minkowski distance of order p between the above two points X and Y may be defined by the following notation:

$$D(X, Y) = \left( \sum_{i=1}^{n} |x_i - y_i|^p \right)^{1/p}$$

Step 908 includes providing a second set of creative professionals as recommendations for being assigned to the project based at least in part on the respective distances. In one or more embodiments, providing a second set of creative professionals as recommendations for being assigned to the project further includes providing for display a listing of a subset of the second set of creative professionals (e.g., the interface 600), the listing including a respective graphical element corresponding to each creative professional from the subset of the second set of creative professionals.

Hardware Overview

Figure 10:
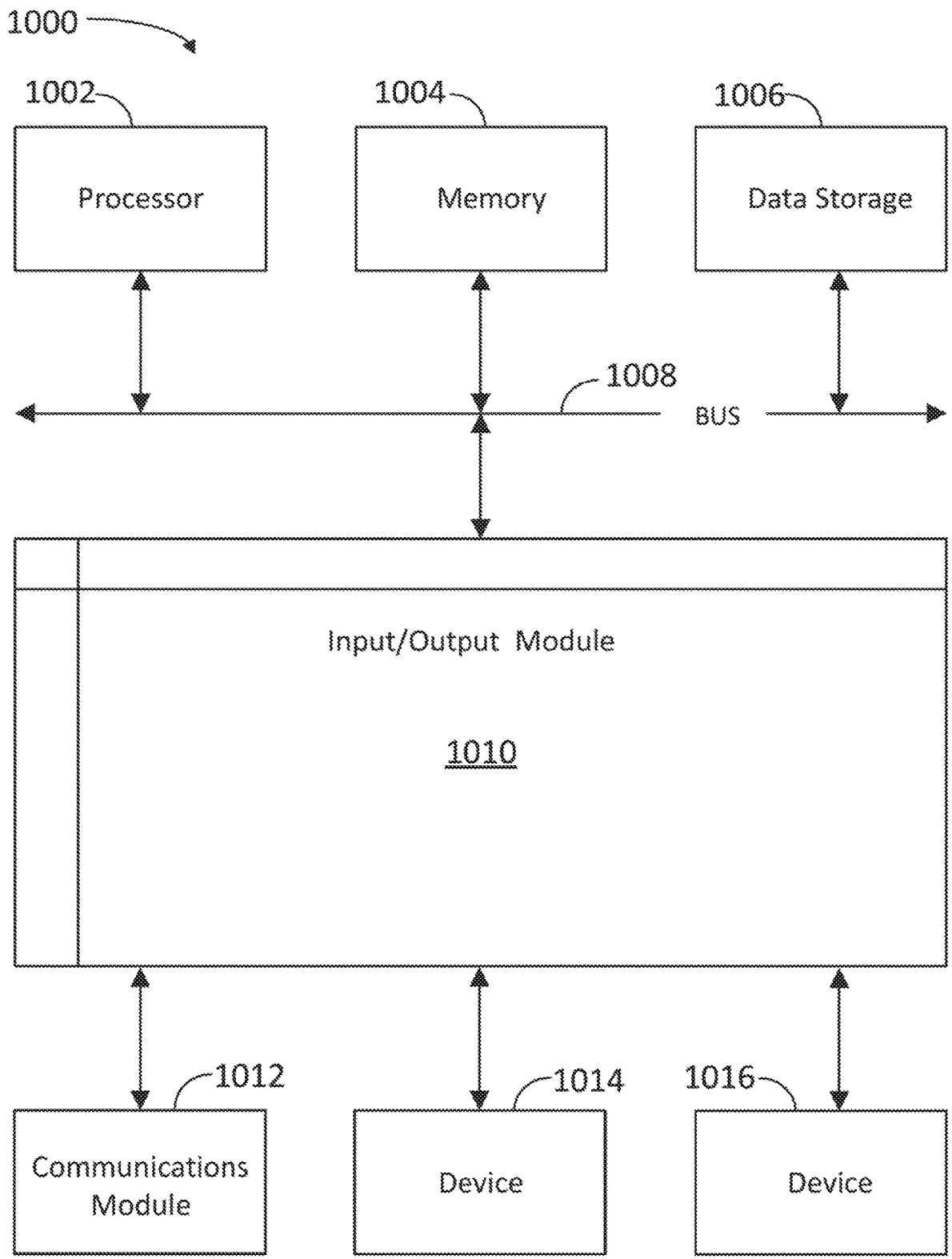
FIG. 10 is a block diagram illustrating an example computer system with which the client and server of FIGS. 1 and 2 and the methods of FIGS. 8 and 9 can be implemented.

FIG. 10 is a block diagram illustrating an exemplary computer system 900 with which the client device 110 and server 130 of FIGS. 1 and 2, and the methods of FIGS. 8 and 9 can be implemented. In certain aspects, the computer system 1000 may be implemented using hardware or a combination of software and hardware, either in a dedicated server, or integrated into another entity, or distributed across multiple entities.

Computer system 1000 (e.g., client device 110 and server 130) includes a bus 1008 or other communication mechanism for communicating information, and a processor 1002 (e.g., processors 212 and 236) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218 and 238) include networking interface cards, such as Ethernet cards and modems. In certain aspects, input/output module 1010 is configured to connect to a plurality of devices, such as an input device 1014 (e.g., input device 214) and/or an output device 1016 (e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client device 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C, any combination of A, B, and C, and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving information related to a project, the information including a first set of criteria associated with the project, the first set of criteria comprising visual characteristics related to a brand;
   determining, using a statistical model, a vector representation corresponding to a candidate creative professional based on the information related to the project;
   determining respective vector representations of a first set of multiple creative professionals based at least in part on profile information related to each of the creative professionals;
   determining respective distances of each of the respective vector representations from the vector representation corresponding to the candidate creative professional; and
   providing a second set of creative professionals as recommendations for being assigned to the project based at least in part on the respective distances.

2. The computer-implemented method of claim 1, further comprising:
   selecting, from the first set of criteria, a second set of criteria to filter one or more profiles of creative professionals, each of the one or more profiles including profile information related to a particular creative professional, wherein the second set of criteria comprises a geographical location or a tier of creative professional;
filtering a set of profiles of a plurality of creative professionals based on the second set of criteria; and
providing the set of profiles for determining respective vector representations of the creative professionals.

3. The computer-implemented method of claim 2, wherein filtering the set of profiles based on the second set of criteria further comprises:
removing at least one profile from the set of profiles when at least one of the geographical location or the tier of creative professional does not match the profile information in the at least one profile.

4. The computer-implemented method of claim 1, wherein the vector representation corresponding to the candidate creative professional is based on a category of content items for the project, a score associated with the category of content items, and one or more access tags.

5. The computer-implemented method of claim 1, wherein each of the respective distances comprises a Minkowski distance based on two respective points in a vector space.

6. The computer-implemented method of claim 1, wherein each of the creative professionals are associated with respective user accounts.

7. The computer-implemented method of claim 1, wherein the first set of criteria of the project includes a type of content item, a quantity of content items, a date related to a deadline to complete the project, a location of the project, or a description of the project.

8. The computer-implemented method of claim 1, wherein the profile information related to each of the creative professionals includes a measure of accepted content items, a measure of timeliness for completing one or more projects, and a number of completed projects.

9. The computer-implemented method of claim 1, wherein the profile information related to each of the creative professionals includes a score associated with a category, the score indicating a measure of skill of a particular creative professional in providing content items in the category.

10. The computer-implemented method of claim 1, wherein providing the second set of creative professionals as recommendations for being assigned to the project further comprises:
providing for display a listing of a subset of the second set of creative professionals, the listing including a respective graphical element corresponding to each creative professional from the subset of the second set of creative professionals.

11. A system comprising:
one or more processors; and
a memory coupled to the one or more processors, the memory including instructions that, when executed by the one or more processors, cause the one or more processors to:
receive information related to a project, the information including a first set of criteria associated with the project, the first set of criteria comprising visual characteristics related to a brand;
determine, using a statistical model, a vector representation corresponding to a candidate creative professional based on the information related to the project;
determine respective vector representations of a first set of multiple creative professionals based at least in part on profile information related to each of the creative professionals;
determine respective distances of each of the respective vector representations from the vector representation corresponding to the candidate creative professional; and
provide a second set of creative professionals as recommendations for being assigned to the project based at least in part on the respective distances.

12. The system of claim 11, wherein the memory includes further instructions that, when executed by the one or more processors, further causes the one or more processors to:
select, from the first set of criteria, a second set of criteria to filter one or more profiles of creative professionals, each of the one or more profiles including profile information related to a particular creative professional, wherein the second set of criteria comprises a geographical location or a tier of creative professional;
filter a set of profiles of a plurality of creative professionals based on the second set of criteria; and
provide the set of profiles for determining respective vector representations of the creative professionals.

13. The system of claim 12, wherein to filter the set of profiles based on the second set of criteria further causes the one or more processors to:
remove at least one profile from the set of profiles when at least one of the geographical location or the tier of creative professional does not match the profile information in the at least one profile.

14. The system of claim 11, wherein the vector representation corresponding to the candidate creative professional is based on a category of content items for the project, a score associated with the category of content items, and one or more access tags.

15. The system of claim 11, wherein each of the respective distances comprises a Minkowski distance based on two respective points in a vector space.

16. The system of claim 11, wherein each of the creative professionals are associated with respective user accounts.

17. The system of claim 11, wherein the first set of criteria of the project includes a type of content item, a quantity of content items, a date related to a deadline to complete the project, a location of the project, or a description of the project.

18. The system of claim 11, wherein the profile information related to each of the creative professionals includes a measure of accepted content items, a measure of timeliness for completing one or more projects, and a number of completed projects.

19. The system of claim 11, wherein the profile information related to each of the creative professionals includes a score associated with a category, the score indicating a measure of skill of a particular creative professional in providing content items in the category.

20. A non-transitory computer-readable medium comprising instructions, which when executed by a computing device, causes the computing device to perform operations comprising:
receiving information related to a project, the information including a first set of criteria associated with the project, the first set of criteria comprising visual characteristics related to a brand;
determining, using a statistical model, a vector representation corresponding to a candidate creative professional based on the information related to the project;

determining respective vector representations of a first set of multiple creative professionals based at least in part on profile information related to each of the creative professionals;

determining respective distances of each of the respective vector representations from the vector representation corresponding to the candidate creative professional; and providing a second set of creative professionals as recommendations for being assigned to the project based at least in part on the respective distances.

* * * * *